UNITED STATES PATENT OFFICE.

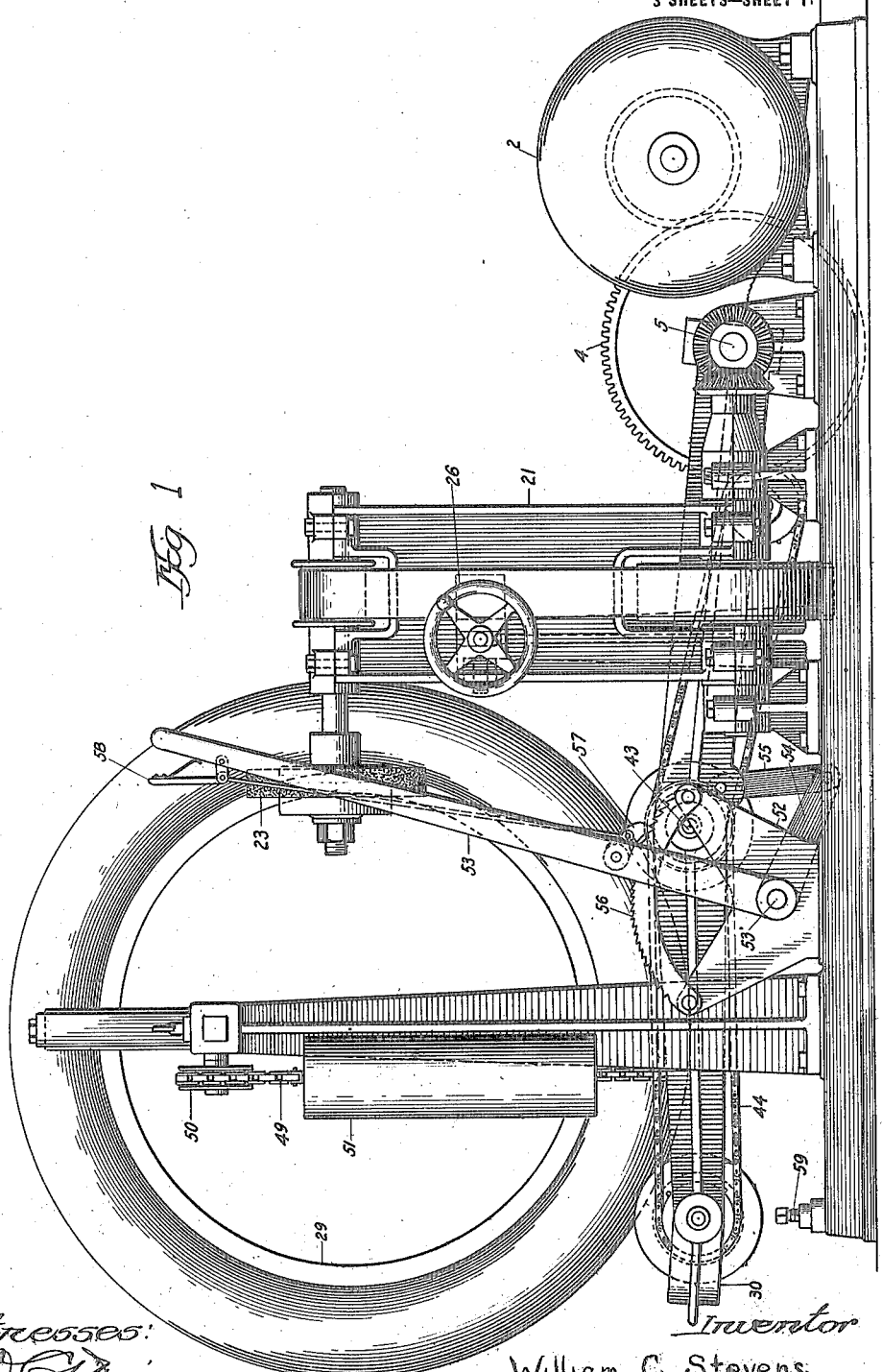

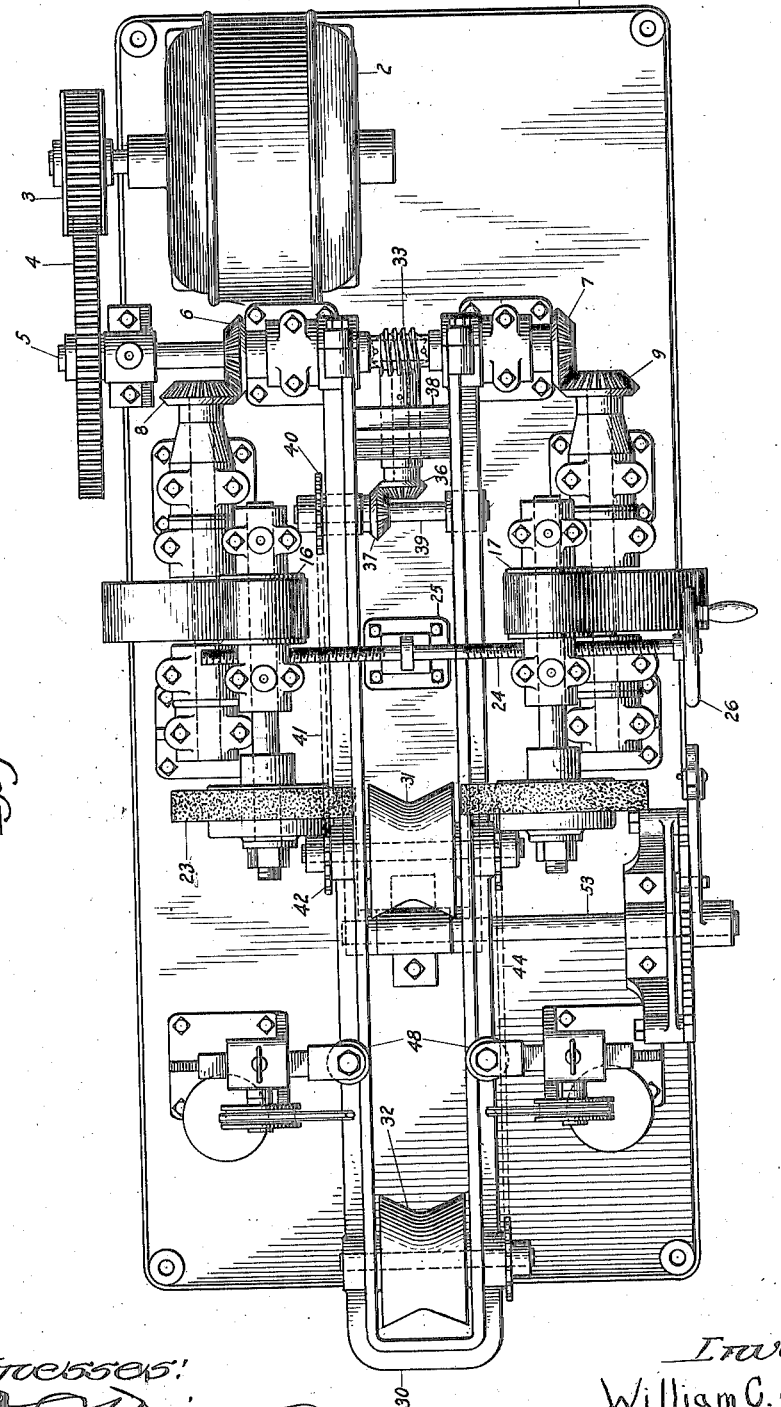

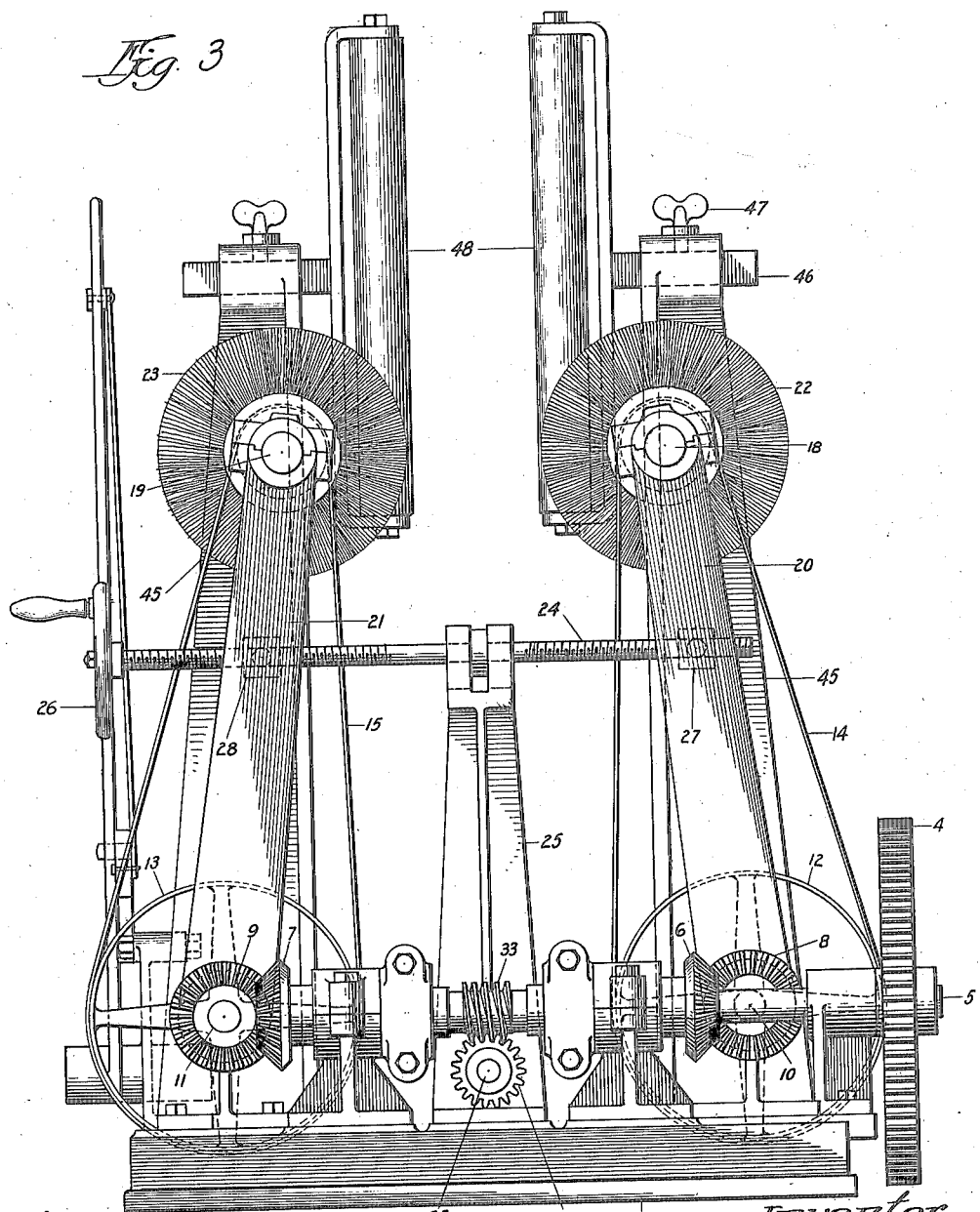

WILLIAM C. STEVENS, OF SUMMIT COUNTY, OHIO, ASSIGNOR TO THE FIRESTONE TIRE & RUBBER COMPANY, OF AKRON, OHIO, A CORPORATION OF OHIO.

CORE-CLEANING MACHINE.

1,283,948.

Specification of Letters Patent.

Patented Nov. 5, 1918.

Application filed August 8, 1917. Serial No. 185,170.

*To all whom it may concern:*

Be it known that I, WILLIAM C. STEVENS, a citizen of the United States, and a resident of Summit county, State of Ohio, have invented certain new and useful Improvements in Core-Cleaning Machines, of which the following is a specification.

In the manufacture of tires, bits of rubber, dirt and other substances adhere to the core after a tire has been removed, and particularly to the portion of the core at about the bead line and to the sides of the rib or "tongue" around the inside of the core. It is necessary that these particles of rubber and the like be removed from the core before it can be used again. It was formerly the practice for the men who removed the tires to scrape off the adhering rubber and dirt, but this operation consumed the time of the workman, and was often slighted, resulting in unsatisfactory conditions of manufacture.

It has been the purpose of this invention to construct a machine to clean the lower inside surfaces of the core and the inner rib or tongue.

In the drawings:

Figure 1 is a side elevation of the core cleaning machine showing the core in position.

Fig. 2 is a plan, and

Fig. 3 is a rear elevation.

The machine forming the subject matter of this invention is mounted on a base 1 on one corner of which is secured a motor 2 to drive the machine. The armature of the motor carries a pinion 3 in mesh with a larger gear 4 carried at one end of the main driving shaft 5. Bevel gears 6 and 7 are carried by the shaft and drive bevel pinions 8 and 9 on the ends of jack-shafts 10 and 11 respectively, which are mounted in standards on the base of the machine. Pulleys 12 and 13 are driven by these shafts and are connected by belts 14 and 15 to smaller pulleys 16 and 17 which drive brush shafts 18 and 19. The brush shafts are rotatably mounted in the upper ends of swinging rocker arms or brush supports 20 and 21 which are pivoted on the shafts 10 and 11. On the ends of the shafts 18 and 19 are secured circular brushes 22 and 23 which are composed of numerous fine steel bristles.

It is necessary that the brushes be moved in and out as the core is placed between them owing to the transverse curvature and in order to force the brushes against the core to remove the adherent rubber. In order to move the brushes laterally of the core the supports 20 and 21 are mounted to rock about their shafts. A reversely screw threaded rod 24 is held against lateral movement in a standard 25 secured to the base of the machine. The front end of the shaft carries a hand wheel 26 by which it may be operated to rock the supports toward or away from each other, motion being communicated to the supports by nuts 27 and 28 pivoted thereon.

The core which is designated by the numeral 29 is carried in a rocking support or cradle which may be lowered into position to receive or discharge a core and raise it into position between the brushes. The cradle is indicated at 30 and consists of an elongated U-shaped framework which extends longitudinally of the base of the machine and is pivoted at its rear end on the drive-shaft 5. In the front end of the cradle are mounted two parallel concave rollers 31 and 32 which form a rest for the core. The core is rotated slowly by motion imparted to the rollers 31 and 32 from the drive shaft 5. A worm 33 is carried centrally of the drive shaft which meshes with a worm gear 34 carried on the end of a longitudinal shaft 35, the forward end of which carries a bevel pinion 36 in mesh with a second bevel pinion 37. The shaft 35 is carried in a cross piece 38 on the cradle 30. The pinion 37 is carried on a transverse shaft 39 also mounted in the frame one end of which is extended at the side of the U-shaped cradle frame and carries a sprocket wheel 40. The sprocket wheel 40 is connected by a chain 41 to a second sprocket wheel 42 carried on the shaft 43 of the roller 31. The roller 32 is driven in the same direction and at the same speed as roller 31 by a connecting sprocket chain 44.

On each side of the cradle and on the base 1 is secured an upright standard 45 in the upper end of which is mounted a cross arm 46 secured for lateral adjustment by a thumb-screw 47. The ends of the arms carry vertical rollers 48 which are intended to project over the sides of the cradle and support the core in vertical position, the adjustment of the rollers being for the purpose of enabling the machine to handle cores of different cross section, while the rollers are elongated as shown to accommodate cores of different diameter. Chains 49 are secured to the cradle 30 and running over pulleys 50 support counterweights 51 which serve to balance the cradle and assist the operator in raising it. To a bracket 52 on the base of the machine is pivoted a handle 53, which operates shaft 53' carrying a lever 54 connected by a link 55 to the cradle at about its midway point. A rack 56 is also secured to the bracket 52 the handle carrying a pawl 57 adapted to engage the rack. A grip member 58 is provided on the handle to release the pawl as will be readily understood. An adjustable stop 59 is carried on the front end of the base and serves as a rest for the core support in its lowered position.

The operation of the machine will require but little explanation. The cradle is first lowered by manipulation of the handle 53 until its outer end rests on the stop 59. The brushes being withdrawn by actuation of the hand wheel 26 the core is rolled on to the supporting rollers 31 and 32, which are continuously rotated during the operation of the machine, being maintained in vertical position by the side rollers 48. The operator now grasps the hand lever 53 and draws it toward him, raising the cradle upwardly and bringing the lower part and inside edge or tongue of the core into line with the brushes, as shown in Fig. 1. The brushes, which are rotating at a high rate of speed, are now fed inwardly until forced into contact with the core. The slow rotation of the supporting rollers revolves the core on its axis while the rapid rotation of the wire brushes removes all traces of rubber and dirt from the surfaces acted upon by the brushes. In tire factories cores of all sizes are usually stripped in the same room and it is essential, in a machine of this character, to provide means for rendering it quickly and easily adaptable to handle cores of all sizes as they come indiscriminately from the strippers. Although I have shown the side rollers 48 as adjustable it is not essential that they be continually adjusted as they can be set for a maximum width and the core is so heavy that it ordinarily will maintain itself in upright position of its own weight. It is necessary, however, that the machine readily handle cores of varying diameter. For this purpose the machine is so designed that any size core may be brought into correct position with respect to the brush 23 without any adjustments other than a movement of the lever 53 to a greater or lesser extent necessary to bring the lower edge of the core in line with the brushes. This result is obtained by means of the pivotally mounted carriage or cradle 30, as it is possible, swinging the cradle about its pivot shaft 5 by means of the lever 23, to bring the lower edge of a core of any diameter in line with the brushes.

It is obvious that changes and modifications may be made in the invention without departing from the spirit of the invention or sacrificing any of its benefits.

I claim:

1. In a machine of the character described, the combination of a base plate, a cradle pivotally mounted on said plate, means for holding a core on the end of said cradle, a brush located at the side of the core holding means, and means for rocking the cradle to bring the core into line with the brush.

2. In a machine of the character described, the combination of a cradle, a pivotal mounting for said cradle, rollers on said cradle for holding a core, a brush at the side of the rollers, means for rocking the cradle about its pivot to bring the core in line with the brush, and means to cause the core to revolve on its axis past the brush.

3. In a machine of the character described, the combination of a cradle, a pivotal mounting for the cradle, rollers for supporting a core on said cradle, a brush at the side of the cradle and above the rollers, means for rocking said cradle and maintaining it in any position of rotary adjustment, and means for rotating said rollers.

4. In a machine of the character described, the combination of a cradle, a pivotal mounting for said cradle, a brush at the side of and above said cradle, means for moving the cradle about its pivot to cause it to approach the brush, means for moving the brush laterally, and means for causing the brush to act over a side of a core on the end of the cradle.

5. In a machine of the character described, the combination of a pivotally mounted cradle, rollers on the end of said cradle, a brush at the side of the cradle and above the rollers, means for moving the cradle about its pivot to cause the rollers to approach the brush, a laterally movable support for said brush and means for rotating the rollers to cause a core carried thereon to revolve on its axis past the brush.

WILLIAM C. STEVENS.